United States Patent Office 2,835,642
Patented May 20, 1958

2,835,642

POLYBUTADIENE COATED MICA FLAKES, PROCESS OF PREPARATION, AND CURED COMPOSITION

Moyer M. Safford, Schenectady, and Elizabeth Joy Smith, Cohoes, N. Y., assignors to General Electric Company, a corporation of New York No Drawing. Application March 27, 1956
Serial No. 574,337

6 Claims. (Cl. 260—41.5)

This invention relates to curable compositions comprising (1) polymerized 1,3-butadiene (hereafter called "polybutadiene"), (2) mica flakes, and (3) di-α-cumyl peroxide; and the cured compositions thereof. This invention also relates to a process of preparing micaceous materials of enhanced strength which comprises curing a mixture of polybutadiene and mica flakes with di-α-cumyl peroxide. Still more particularly this invention relates to sheets of the above described materials and the process of preparing them.

Heretofore, mica and other micaceous cleavable rocks have been treated so as to produce thin flakes of relatively high area. Micaceous flakes have been produced having a thickness which may be as low as a thousandth of a millimeter or less and an area of one square centimeter or more. These flakes which have been described as fired, comminuted mica flakes can be prepared by the methods disclosed in the following U. S. patents: 2,405,576—Heyman, 2,490,129—Heyman, 2,549,880—Bardet, 2,614,055—Genarcleus, 2,659,412—Heyman, 2,708,032—Heyman, etc., as well as by other methods known to the art, have been employed with or without additional materials in the manufacture of sheets of varying thickness. These materials have been used as dielectric elements in such applications as slot armour, wedges, and segment insulation in generators and motors and as the dielectric separation in high voltage, high temperature condensers, etc., and have also been treated with various organic materials so as to render them more cohesive, stronger, more water resistant, etc. But in most cases these organic-micaceous compositions are difficult to cure to a hard material, the curing period is too long to make its use attractive to commercial production, the composite body formed is not stable at high temperatures, the electrical properties of the final product are inferior, etc.

We have now discovered that micaceous sheet materials of enhanced strength can be prepared by curing compositions comprising (1) polybutadiene, (2) mica flakes and (3) di-α-cumyl peroxide by a "short cure" method which is attractive to commercial production. These cured sheets have approximately twice the strength of the corresponding untreated mica flake sheets, and are stable at temperatures over 200°–250° C. Such heat stability is unexpected with a totally hydrocarbon material. It could not have been predicted that this composition could be cured by such a strong binder within this short period, since as disclosed in the prior art, polybutadiene could be cured by treatment with heat alone or heat and other peroxides only over extended periods of time. In addition, because of its heat stability the uncured compositions can be shipped without deleterious effects. In addition to improving tensile strength polybutadiene also imparts water-resistance to the mica and can be used to bind mica to other surfaces. Thus, there is produced in accordance with this invention an improved dielectric material which retains the desirable electrical characteristics of mica paper and overcomes the limitations imposed on mica sheets due to its low tensile strength.

In general, the process is carried out by (1) impregnating mica flakes with a solution of polybutadiene containing di-α-cumyl peroxide, (2) pressing these impregnated flakes together, (3) evaporating off any liquid or solvent that may be present, and (4) curing the resulting sheet.

Since it is more difficult to impregnate mica flakes evenly with undiluted polybutadiene, a solution, preferably dilute, of polybutadiene, containing di-α-cumyl peroxide is usually employed. Any mutual solvent for polybutadiene and dicumyl peroxide can be employed. Since it is preferred that the solvent be easily removed at a low temperature, a low boiling solvent, for example, alcohols, such as ethanol, hydrocarbons, e. g. benzene, chlorohydrocarbons, ethylene dichloride, chloroform, etc., toluene, etc., ethers, etc. are used. Thus, 1 to 50% or higher solutions of polybutadiene containing dicumyl peroxide, but preferably 5 to 20% based on weight of total solution, can be used.

If one desires to add polybutadiene to an aqueous slurry of mica flakes, the polybutadiene can be emplsified by any suitable means. Briefly, it may be stated that such emulsions are usually prepared by forming an emulsion of water and the polybutadiene in which the latter comprises about 0.5 to 20% or more of the total weight of the two ingredients, adding the emulsifying agent to the mixture of ingredients and homogenizing the latter until a suitable emulsion or emulsion dispersion is obtained employing usual means for this purpose.

Among such emulsifying agents may be mentioned, for instance, the sulfonated amide condensation products of fatty acids with organic amines, sulfonated aromatic and mixed alkyl aryl sulfonate derivatives, and sulfonated ester derivatives. Particularly satisfactory ones are "Nilo–SD" which is a mixture of sulfonated fatty acid amides and sulfonamides of the same fatty acids manufactured by Sandoz Chemical Works, New York, New York, and "Pluramine S–100" which is an acid amide condensate, manufactured by Kearny Manufacturing Company, Kearny, New Jersey. The actual amount of emulsifying or dispersing agent employed may be varied widely and generally will comprise from 0.1 to 1% by weight based on the weight of the entire treating mixture. It is preferable that the emulsifying agent used be one which maintains maximum stability of the emulsion and permits the deposition of the polybutadiene on the mica flakes prior to breaking of the emulsion or dispersion.

Emulsions may also be prepared from decomposable emulsifying agents, such as quaternary ammonium salts, such as alkyl aryl ammonium halides, specifically trimethylbenzyl ammonium chloride and hexadecyldimethylbenzyl ammonium chloride, etc. The emulsified solution is applied to mica flakes and then heated to decompose and remove the emulsifying agent from the product.

Emulsifying agents which are preferred are non-ionic emulsifying agents since these agents do not appreciably affect the electrical properties of the product. Among the non-ionic emulsifying agents which may be mentioned are those described in Schwartz and Perry's text on "Surface Active Agents," pp. 202–213, Inter Science Publishers (1949), which pages are incorporated by reference into the present application.

1,3-butadiene can enter into a polymer chain by either a 1,2- or 1,4-mode of addition; the 1,2-mode of addition results in the following "dangling vinyl" structure:

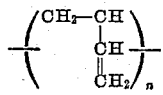

(hereafter called "1,2-polybutadiene") whereas the 1,4-mode of addition results in the following structure:

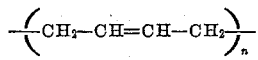

(hereafter called "1,4-polybutadiene"). Two types of catalysts are generally used to polymerize 1,3-butadiene, namely the free-radical and the alkali metal type catalyst. When 1,3-butadiene is polymerized by free-radical type catalysts, such as peroxides, persulfates, etc. in an aqueous emulsion system, a higher proportion of 1,4-polybutadiene results as compared to the product produced by the alkali metal type catalyst where a higher proportion of 1,2-polybutadiene is obtained. Using free-radical catalysts one obtains polybutadiene having less than 25% 1,2-polybutadiene.

Although both free-radical polymerized butadiene and alkali metal polymerized butadiene can be cured with di-α-cumyl peroxide, the alkali metal polymerized butadiene is cured to a much harder product within a shorter period of time than free-radical polymerized butadiene. This appears to be due to the fact that alkali metal polymerized butadiene which contains larger amounts of "dangling vinyl group" (1,2-polybutadiene) cures more readily with di-α-cumyl peroxide to produce a harder polymer than the free radical cured butadiene which has its residual double bonds "buried" in the chain of the 1,4-polybutadiene. In order to cure polybutadiene to a very hard polymer within a short period of time, it is necessary to use polybutadiene having a high percentage of the 1,2-type i. e. over 30% and preferably 50–100% of 1,2-polybutadiene.

Among the alkali metal type catalysts which have been used to produce polybutadiene having high percentages of 1,2-polybutadiene are alkali metals and compounds containing alkali metals. Thus, metals such as lithium, sodium, potassium, rubidium, cesium, and sodium and potassium alloys, and compounds of these metals such as phenyl isopropyl potassium, triphenyl methyl sodium, lithium butyl, amyl sodium and the like compounds has been used to effect such polymerization.

Whereas free radical catalysts tend to produce larger amounts of 1,4-polybutadiene, catalysts of the alkali metal type tend to increase the ratio of the 1,2-polybutadiene. However, temperature as well as catalysts affect the type of polymer formed. For example, polybutadiene produced by polymerizing 1,3-butadiene with sodium at 110° C. contains about 15% of the 1,2-polybutadiene whereas 100% of 1,2-type polymer is produced when 1,3-butadiene is polymerized with sodium at −70° C. Although the ratio of the 1,2- to the 1.4-polybutadiene can be determined by ozonization, probably the more accurate method of determining this ratio is by the use of infrared spectra. Infrared curves identifying the different types of polymers are found in Dogadkin et al., "Rubber Chemistry and Technology," 24, 591–596 (1951); Hampton, "Anal. Chem.," 21, 923–926 (1949); and Meyer, "Ind. Eng. Chem.," 41, 1570–1577 (1949). An excellent description of polybutadiene polymers is found in Whitby, "Synthetic Rubber," pp. 734–757, Wiley and Sons, N. Y. (1954), wherein are described methods of preparing polybutadiene falling within the scope of this invention.

Since molecular weight is related to viscosity, viscosity measurements are a convenient method of expressing the molecular weight. Although polybutadiene gums of a broad intrinsic viscosity range can be employed, we advantageously have employed polybutadiene having an intrinsic viscosity of about 1.0 to 8.0 or higher. Optimum properties are obtained using polybutadiene having an intrinsic viscosity of 3.0 to 6.0.

Inherent viscosity is determined by a viscometer such as an Ostwald viscometer on a 0.25 percent solution of polybutadiene in benzene. This value is calculated as the natural logarithm of the raio of flow time of the solution to the flow time of the solvent divided by the concentration in grams/100 ml. Intrinsic viscosity [η] is obtained by extrapolating the inherent viscosity vs. concentration curve of zero concentration.

The percent of polybutadiene in the micaceous material, based on total weight, should be as low as possible consistent with enhancing the tensile strength of the material. Thus, the percent of polybutadiene can be from 0.5%–20% or higher, but preferably 1–5%.

The above described composition can be cured to products of this invention with di-α-cumyl peroxide,

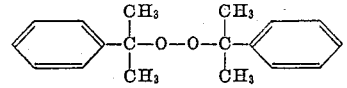

which peroxide can be prepared in the manner described in Karasch et al., "Journal of Organic Chemistry," 15, pp. 753–762 (1950). The proportion of this peroxide to polybutadiene can be varied over wide limits depending on the characteristics desired in the final product. Preferably, we employ the peroxide in amounts ranging from .1 to 10 percent or higher, based on weight of polymer. Optimum properties and curing time are obtained with about from 1 to 7 percent of peroxide based on weight of polymer.

In order that those skilled in the art may better understood how the present invention may be practiced, the following examples are given by way of illustration and not by way of limitation. All parts are by weight.

*Example 1*

Mica flakes were prepared by the method described in U. S. Patent 2,614,055. In this process natural Muscovite mica was heated to a temperature of about 800–850° C. whereby the mica was rendered swollen and friable. Thereupon, this material was immersed in an aqueous medium so as to cleave the micaceous material into flakes which were subsequently disintegrated into flakes by agitation while immersed in the aqueous medium. These flakes were thereupon washed and dried.

*Example 2*

A rubbery polymer was prepared from 1,3-butadiene and finely divided sodium using the technique described in Marvel et al., "J. Polymer Science," I, 275 (1946). The following procedure was employed: "Into clean, dry bottles was placed 0.1 g. of finely divided sodium dispersed in toluene. Thereafter, 25 g. of 1,3-butadiene was charged as a liquid. A small amount of the butadiene was allowed to evaporate to displace any air remaining in the bottle. The bottles were capped, and rotated at 30° C. for a period of 48 hours. The residuai catalyst was deactivated by adding 15 ml. of a 10% solution of absolute alcohol in benzene. The rubber was recovered by precipitation from a benzene solution by addition of ethyl alcohol until polymer no longer precipitated. To this precipitated product was added 0.1% of phenyl-β-naphthylamine as an antioxidant." This unwashed polymer had an intrinsic viscosity of 6.0 when measured in benzene solution. By infrared analysis, this product contained at least 60% of 1,2-polybutadiene.

*Example 3*

The mica flakes produced in Example 1 were slurried in a 10% benzene solution of polybutadiene prepared by dissolving 10 parts of the polybutadiene prepared in Example 2 in 90 parts of benzene. To this solution was added 3% di-α-cumyl peroxide based on weight of polybutadiene. This slurry was filtered to give a sheet which was dried by suction and subsequently cured at 170° C. for 30 minutes. As a control a sheet was prepared by suspending the mica flakes of Example 1 in water, filtering off the water, and drying the sheet by suction.

In contrast to the sheet of mica flakes without polybutadiene, which had a 30° C. tensile strength of 2000 pounds per square inch (p. s. i.), the cured polybutadiene-mica flake sheet had a tensile strength of 3600 p. s. i.

In addition to the mica flakes prepared by the method described, other mica flakes prepared by other methods known to the art, such as those described in the above-named patents can also be employed.

The products of this invention can be used for those applications where mica flake sheets are now employed, for example, as dielectric elements in such applications as generators, motors, high voltage capacitors, etc. These compositions can be used in the form of paper, cardboard, or other sheet material, molded materials, etc. In addition, the sheets of mica paper or board produced according to this invention can also be laminated together in any desired number by an additional binding layer of polybutadiene and subjected to the action of a press at a sufficiently high temperature to cure the di-α-cumyl peroxide contained therein.

What we claim as new and desire to secure by Letters Patent of the United States is:

1. A curable composition comprising comminuted mica flakes impregnated with 0.5–20% polybutadiene containing 0.1–10% di-α-cumyl peroxide, said polybutadiene containing at least 30% 1,2-polybutadiene.

2. The composition of claim 1 wherein polybutadiene comprises at least 50% of 1,2-polybutadiene.

3. The cured composition of claim 1.

4. The cured composition of claim 2.

5. A process of preparing micaceous sheet materials of enhanced strength which comprises (1) impregnating fired, comminuted mica flakes with 0.5–20% polybutadiene containing 0.1–10% di-α-cumyl peroxide, said polybutadiene containing at least 30% 1,2-polybutadiene, (2) forming the resulting composition into a sheet, and (3) curing the resulting product.

6. The process of claim 5 wherein the polybutadiene comprises at least 50% 1,2-polybutadiene.

References Cited in the file of this patent

UNITED STATES PATENTS 1,883,645    Ellis _____ Oct. 18, 1932

OTHER REFERENCES

Chem. & Eng. News, volume 33, No. 20, May 16, 1955, page 2079.